Patented Jan. 6, 1948

2,434,087

UNITED STATES PATENT OFFICE 2,434,087

BREAD MAKING METHOD AND INGREDIENTS

Frederick C. Weber, Eastchester, N. Y.

No Drawing. Application January 23, 1945, Serial No. 574,196

11 Claims. (Cl. 99—90)

This invention relates to improvements in the manufacture of bread, and to amino acid mixtures for bread making and for other purposes.

The invention relates more especially to products manufactured from doughs made from whole wheat flour, bolted white flour, rye flour and graham flour, and more particularly to the manufacture of leavened bread from any or all of these products. The term "flour" is used herein to denote any of the above types of flour or other edible flour from which bread can be made.

At the present time the individual amino acids, either synthetically produced or separated from protein hydrolysates, are far too costly to permit of wide-spread use in a staple and relatively inexpensive article such as bread. The enrichment of bread, particularly white bread, with proteins in the form of amino acids materially adds to the nutritive value by supplying these elements, a large portion of which are lost during the highly refining processes that the wheat and flour undergo in milling.

Bread is now enriched with minerals and vitamins with the object of increasing its nutritive value. The protein elements and protein constituent in bread have been neglected. Bread is deficient in total proteins, more particularly those of amino acids which are essential in nutrition. This invention is designed to correct, in part at least, this deficiency and for other improvements as set forth in the objects below.

One of the objects of the invention is to provide in concentrated form, a mixture containing all of the amino acids derived from the hydrolysis of proteins for use as an ingredient for bread baking in place of one or more selected, individually separated, amino acids.

Another object of the invention is to improve the flavor and aroma of the bread.

Another object of the invention is to add to the nutritive value of the bread.

Still another object is to provide in a form suitable for use in bread, the proteins or groups of protein materials rich in the amino acids deemed essential in nutrition, and thereby enriching the baked product in these particular amino acids.

Another object is to provide an improved method of making bread with an unseparated mixture of amino acids as one of the ingredients, and with the amino acid, cystine, as a constituent of the mixture to provide an oxidizing element and improver for the bread. The use of cystine alone is described in my Patent No. 2,280,031, dated April 14, 1942. An unseparated mixture of amino acids containing cystine provides the cystine at lower cost and I have discovered that the other amino acids not only do not interfere with the beneficial action of the cystine on the bread, but that some or all of the amino acids present in an hydrolysate of protein materials that contain a wide variety of amino acids, apparently supplement the action of the cystine, because the actual quantity of cystine required when employed in such an unseparated mixture is somewhat less than when used without these other acids.

This invention renders unnecessary the use of inorganic oxidizing salts combined with other inorganic salts as "yeast nutrients" or "dough improvers" or "dough conditioners" now commonly employed in bread baking, and results in a substantial saving to the baker.

Another object is to provide the concentrate in syrup form, as will be more fully explained, but some features of the invention are not limited to a liquid concentrate and the mixture may be in the form of a powder. Such a powder can be conveniently produced from the liquid by spray drying, a practice well understood in the art.

Proteins are hydrolyzed into their constituent amino acids by boiling with acids, such as hydrochloric or sulfuric acid, or alkalis and by the action of proteolytic enzymes. Alkaline hydrolysis is rarely used, except when the estimation or separation of the amino acid tryptophane is required, since such hydrolysis tends to decompose other amino acids and results in losses and the production of disagreeable odors and flavors. Enzymatic hydrolysis is desirable in that by this means the amino acids are not destroyed and undergo but little chemical change during the process. The time required, however, to effect a satisfactory degree of hydrolysis is excessive, amounting to several days.

Of importance in metabolism and nutrition there are, at present, twenty-three different amino acids generally accepted as constituents of proteins. A few others have been reported but not as yet accepted, and others are still being discovered, in the products of protein hydrolysis. Certain proteins contain practically all of the recognized amino acids, but in different proportions. Some proteins are highly deficient in one or several of the amino acids, while in others certain individual amino acids are particularly plentiful. It is thus evident that a diversified source of protein materials is highly desirable. This invention lends itself readily to such practice wherein protein hydrolysates and the syrups, concentrates or powders therefrom can readily be prepared, containing amino acids, in kind or quantity, in any desired proportion.

The amino acid, glutamic acid, or more particularly its acid sodium salt, has among other properties, desirable flavoring qualities. Soybean protein and the proteins of corn and wheat are especially rich in this amino acid. These proteins as raw materials added in proper proportions to other raw material proteins for hydrolysis provide a feasible and simply-applied means to produce concentrated hydrolysates in any form with desirable flavoring properties.

Further illustrative of the possibilities of selection of protein material to provide concentrated hydrolysates having special properties because they contain desirable amino acids, there may be cited preparations in highly concentrated forms containing all of the amino acids essential in nutrition. The amino acids, consisting of lysine, tryptophane, histidine, phenylalanine, leucine, isoleucine, threonine, methionine, valine and arginine, are deemed essential in nutrition in that the animal body is unable to synthesize them from other protein elements ingested and they have to be available, therefore, pre-formed in the diet.

For the purpose of the invention acid or enzymatic hydrolysis is preferred, depending upon the kind of protein material to be hydrolyzed. Certain protein materials of low cost, keratinous materials for example, which are not attacked or only with difficulty by enzymes, are subjected to acid hydrolysis. The acids most commonly used for acid hydrolysis are hydrochloric and sulfuric acid. These acids may be used in various concentrations.

Following is an example of one method of preparing a concentrated syrup from an acid hydrolysis of keratinous material.

One-hundred pounds of dry keratinous material is digested at boiling temperature in a suitable vessel provided with a refluxing condenser with 110 to 115 pounds of 31% hydrochloric acid mixed with 4 to 6 gallons of water for a period of 6 to 8 hours. This period of strong acid hydrolysis forms an amount of amino nitrogen that is a substantial part of the maximum amino nitrogen available from the particular material treated. The hydrolysate after cooling is filtered and clarified by suitable means to remove humin substances and small particles which may have escaped digestion. The filtered hydrolysate is then neutralized, in this particular description, to a pH of 3.8 to 4.0 with sodium acetate, which pH and neutralizing salt is adaptable to the precipitation of the amino acid cystine at this point. After neutralizing as above the mixture is allowed to stand for 24 hours, or longer, and is then filtered to remove the crude cystine, which is further purified as a separate operation. The filtrate from the crude cystine precipitate contains all the remaining amino acids comprising the keratin and a portion of the cystine as well which is not removed by this procedure at the point mentioned. In addition to the cystine remaining, the principal amino acids present in the filtrate are: histidine, lysine, aspartic acid, tryosine, arginine, proline, glycine and glutamic acid. The amount of cystine remaining is sufficient for purposes of this invention. This residual liquor has a deep brown color which is removed to any degree desired by suitable treatment with an efficient decolorizing carbon. The liquor is then concentrated to a syrup by evaporation, preferably under vacuum. The amino acid mixture is preferably evaporated to a condition in which it contains approximately 75% solids and has a titratable acidity of 6% to 8% as acetic acid. The pH of a 10% solution is approximately 4.8.

For some purposes, in rye bread, for example, where a dark-colored interior of the bread is desired, it is not necessary to decolorize as above. Where dark interior color is to be avoided, decolorization is required to a point where after concentration the resultant syrup has a light brown color, at least no darker than malt syrups or dextrose-maltose-dextrin syrups now commonly used in bread baking.

Such a syrup used in bread baking at the rate of 2.0 to 4.0 ounces per 100 pounds of flour yielded loaves of bread noticeably superior in such characteristics regarded by the baker as desirable, namely, volume of the loaf, bloom and crust color, crumb color and grain. Particular superiority was noted in texture, aroma, and flavor. These advantages make the syrup of this invention a desirable supplement for use with such fermentable carbohydrate materials as malt syrups, or dextrose-maltose-dextrin syrups.

When it is desired to prepare a mixture in dry or powder form the acid hydrolysate is neutralized with sodium hydroxide at as low a temperature as possible to a pH of 3.8 to 4.0. After neutralizing, the mixture is allowed to stand 24 hours or longer as in the former description the crude cystine is removed by filtration.

The liquid obtained from the crude cystine is then neutralized to a pH of 6.5 to 6.8. During neutralization to this pH, the acid sodium salt of the glutamic acid is formed and this salt has marked desirable flavoring qualities. The liquid may be dried by spray drying, or in any other suitable way, to obtain the mixture in powder form.

As an example, an amino acid syrup or concentrate which can be converted a dry powder, and which contains all of the recognized essential amino acids (with the exception of tryptophane may be prepared by acid hydrolysis of the following mixture of protein materials. 100 pounds of a mixture of equal parts, or a mixture in proportions suitable for the purpose desired, of keratin, dried casein, hide waste (gelatin), silk waste, dried egg albumin, wheat gluten, and corn gluten or zein, is hydrolyzed at boiling temperature with 110–115 pounds of 31% hydrochloric acid, to which has been added 4 to 6 gallons of water, in a suitable vessel provided with a refluxing condenser, for a period of 12 to 14 hours. The hydrolysate is allowed to cool and then filtered. The clear filtered solution is then decolorized with a suitable decolorizing carbon, the carbon removed by filtration and the acid neutralized with an alkali, such as sodium hydroxide, to a pH of 3.8 to 4.0.

Other substances can be used to neutralize the solution, as for example sodium acetate. If the solution is to be used for a purpose where a high salt content is objectionable, the neutralized solution is evaporated under vacuum to one-half or more of its volume and is again filtered to remove the salt (NaCl) which has separated from the solution. The partially concentrated liquor is preferably further concentrated to a syrupy consistency and a solids content of approximately 70% to 75%.

When keratinous materials are used, acid hydrolysis is necessary because such protein is so resistant to the action of proteolytic enzymes that it cannot be successfully treated by enzymatic hydrolysis. With proteins that are readily attacked by enzymes, or when a very long period of treatment is not objectionable, enzymatic hydrolysis can be used for this invention.

The protein substances used to make the amino acid concentrate of this invention should contain a consequential amount of cystine, when the concentrate is to be used in making bread, because this particular amino acid has a beneficial oxidizing effect in baking. A cystine content of the order of 2% of the solids present in the final concentrate is satisfactory, but this example is given as an illustration and not in any sense as a limitation.

The actual quantity of cystine present may vary over considerable range and still improve the bread as described in my Patent No. 2,280,031, previously referred to. There should be a sufficient amount of cystine present so that when the amino acid mixture of this invention is mixed with the flour there is at least one part of cystine to every 40,000 parts of flour. The amount of cystine used is preferably of the order of one part cystine to 25,000–30,000 parts of flour, but more cystine can be used with no adverse effect.

The amino acid mixtures made in accordance with this invention are intended especially for bread making but may be employed for other purposes where a similar nutritional concentrate is advantageous.

This application is a continuation in part of my abandoned application Serial No. 458,033, filed September 11, 1942, for Method of making bread and ingredients therefor.

I claim:

1. The method of making leavened bread which method includes mixing with the dough, before baking, substantially completely hydrolized protein material including a mixture of unseparated amino acids containing cystine in an amount equal to at least one part for every 40,000 parts of flour in the dough, fermenting the batch.

2. The method of making bread ingredients of higher nutritive value, which method comprises taking unseparated amino acids obtained by strong acid hydrolysis of protein materials and containing cystine and a plurality of amino acids essential in nutrition, and mixing the unseparated amino acids of the hydrolysate with flour and other bread-making ingredients to form a dough, the amount of hydrolysate used being sufficient to provide at least one part of cystine to 40,000 parts of flour.

3. The method of making bread ingredients of higher nutritive value, which method comprises taking unseparated amino acids obtained by strong acid hydrolysis of protein materials that yield an unseparated mixture of cystine and a plurality of amino acids essential in nutrition, from which hydrolysate the color has been removed and mixing the unseparated amino acids of the hydrolysate with flour and other bread-making ingredients to form a dough, the amount of hydrolysate used being sufficient to provide one part of cystine to every 20,000 to 30,000 parts of flour.

4. In the making of leavened bread, the improvement which comprises mixing with the flour a dried and finely powdered substantially complete hydrolysate of protein materials that contain cystine mixed with a combination of amino acids essential in nutrition, the amount of hydrolysate mixed with flour being sufficient to provide at least one part of cystine to every 40,000 parts of flour.

5. In making leavened bread, the improvement that comprises incorporating with the flour and other ingredients of the dough batch, a mixture of unseparated amino acids including cystine there being at least one part of cystine to every 20,000 to 30,000 parts of flour, and fermenting the batch.

6. In making leavened bread, the improvement that comprises incorporating with the flour and other ingredients of the dough batch, a mixture of unseparated amino acids including cystine there being at least one part of cystine to 40,000 parts of flour.

7. The method of making bread comprising making a dough batch including flour and a substantially complete, filtered hydrolysate of keratinous material, which hydrolysate comprises an unseparated mixture containing cystine and other amino acids from the group consisting of lysine, tryptophane, histidine, phenylalanine, leucine, isoleucine, threonine, methionine, valine, and arginine, the amount of cystine present being at least one part to every 40,000 parts of flour and then fermenting the batch.

8. A mixture for making bread of improved quality and higher nutritive value, which mixture including flour and a hydrolysate of protein material comprising cystine and amino acids essential to nutrition, the amount of cystine present being at least one part to every 40,000 parts of flour.

9. A bread-making composition comprising a dough batch containing flour and a substantially complete, filtered hydrolysate of keratinous material, which hydrolysate comprises an unseparated mixture containing cystine and other amino acids from the group consisting of lysine, tryptophane, histidine, phenylalanine, leucine, isoleucine, threonine, methionine, valine, and arginine, the amount of cystine present being at least one part to every 40,000 parts of flour.

10. A dry bread-making mixture for use in preparing dough, which mixture comprises flour and a dried and finely powdered hydrolysate of protein material containing cystine and amino acids essential to nutrition, the amount of cystine present being at least one part to every 40,000 parts of flour.

11. The method of making bread ingredients of higher nutritive value, which method comprises mixing with the flour a substantially complete hydrolysate having a pH of the order of 3.8–4.0 and made from different protein materials and concentrated to a syrup containing approximately 75% solids and at least 2% of cystine mixed with a variety of amino acids essential in nutrition, the amount of syrup used with said ingredients being from 2 to 4 ounces for each 100 lbs. of flour.

FREDERICK C. WEBER.

REFERENCES CITED

The following references are of record in the file of this patent:

UNITED STATES PATENTS

| Number | Name | Date |
|---|---|---|
| 2,049,576 | Ungnade | Aug. 4, 1936 |
| 2,180,637 | Kemmerer | Nov. 21, 1939 |
| 2,241,927 | Sahyun | May 13, 1941 |
| 994,885 | Sulzberger | June 13, 1911 |
| 2,280,031 | Weber | Apr. 14, 1942 |
| 1,680,827 | Wagner | Aug. 14, 1928 |
| 1,854,930 | Frey | Apr. 19, 1932 |